(12) United States Patent
Lazier

(10) Patent No.: US 8,701,109 B1
(45) Date of Patent: Apr. 15, 2014

(54) IMMORTAL INSTANCE TYPE

(75) Inventor: Colin L. Lazier, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 192 days.

(21) Appl. No.: 13/366,495

(22) Filed: Feb. 6, 2012

(51) Int. Cl.
*G06F 9/455* (2006.01)
*G06F 9/445* (2006.01)
*G06F 12/00* (2006.01)

(52) U.S. Cl.
USPC .............................. 718/1; 717/174; 711/101

(58) Field of Classification Search
None
See application file for complete search history.

(56) References Cited

U.S. PATENT DOCUMENTS

| | | | |
|---|---|---|---|
| 8,387,045 B2 * | 2/2013 | Yasutaka et al. | 718/1 |
| 2006/0025985 A1 * | 2/2006 | Vinberg et al. | 703/22 |
| 2007/0033240 A1 * | 2/2007 | Barsness et al. | 707/206 |
| 2008/0163210 A1 * | 7/2008 | Bowman et al. | 718/1 |
| 2008/0209275 A1 * | 8/2008 | Kwan et al. | 714/38 |
| 2008/0301674 A1 * | 12/2008 | Faus | 718/1 |
| 2009/0113413 A1 * | 4/2009 | Reinz | 717/173 |
| 2011/0251992 A1 * | 10/2011 | Bethlehem et al. | 707/610 |
| 2012/0110574 A1 * | 5/2012 | Kumar | 718/1 |
| 2012/0324071 A1 * | 12/2012 | Gulati et al. | 709/223 |
| 2013/0097293 A1 * | 4/2013 | Gibson et al. | 709/221 |

* cited by examiner

*Primary Examiner* — Emerson Puente
*Assistant Examiner* — Adam Lee
(74) *Attorney, Agent, or Firm* — Hope Baldauff, LLC

(57) ABSTRACT

Technologies are described herein for ensuring data in long-term storage will be accessible at a future date. Upon storing the data in long-term storage, a well-defined instance of data processing resources is created on a host computing platform for the installation and testing of a related application that is capable of accessing the stored data. Once testing of the related application is complete, a machine image is generated from the instance and stored with the data in the long-term storage. If access to the data stored in the long-term storage is required at a future date, the data and associated machine image may be retrieved, and a compatible instance of data processing resources created in which the machine image may be restored. The data in the long-term storage may then be accessed by the related applications executing in the newly created instance.

25 Claims, 6 Drawing Sheets

IMMORTAL INSTANCE TYPE

BACKGROUND

An organization or individual user may wish to archive large amounts of data for extremely long periods, such as decades or possibly indefinitely. In some cases the format of the archived data will be independently decipherable, such as a blob of English text, or there may be confidence that the data will be able to be interpreted in the future by a well-known algorithm, such as a JPEG image file, an MPEG move file, an archive file format, e.g. TAR or ZIP, and the like. However, in many cases the format of the archived data may be closely coupled with the application software that produced it and that is required to interpret it. Additionally, the application software may be closely coupled to a particular computer architecture. Therefore, the data archived in long-term storage may become useless if the application software needed to understand the data becomes unable to run because the particular computer architecture is no longer available.

For example, an aircraft manufacturer may wish to store all of the engineering design and testing data that went into the design of an aircraft in long-term storage for the potential 50+ year working life of the aircraft. This data may be produced by a variety of application software programs, including CAD programs, mathematical analysis programs, simulation programs, and the like. In the event of an accident of the aircraft many years later, the aircraft manufacturer may wish to retrieve that data from long-term storage and make use of it for an accident investigation, related litigation, and the like. If a key element of that data is only useful with a corresponding finite element analysis software program, and the software program or the computer architecture on which it depends is no longer available, then access to the key element of data may not be possible.

Along with storing the data in the archival system, the organization or user may also attempt to maintain the software and hardware platforms required to access the data for the 50+ year period of the useful life of the data. However, maintaining physical hardware for such a long period may be impractical. Hardware components and spare parts would have to be stockpiled for that period, and there would be no guarantees that the hardware could remain functional due to aging of parts, sublimation of lubrication, degradation of FLASH or EPROM memory, and the like. In addition, the organization or user may be required to perform periodic testing to ensure that the software and hardware platforms remain available, further increasing the cost of maintaining the hardware and software for such a long period.

It is with respect to these and other considerations that the disclosure made herein is presented.

DETAILED DESCRIPTION

Figure 1:
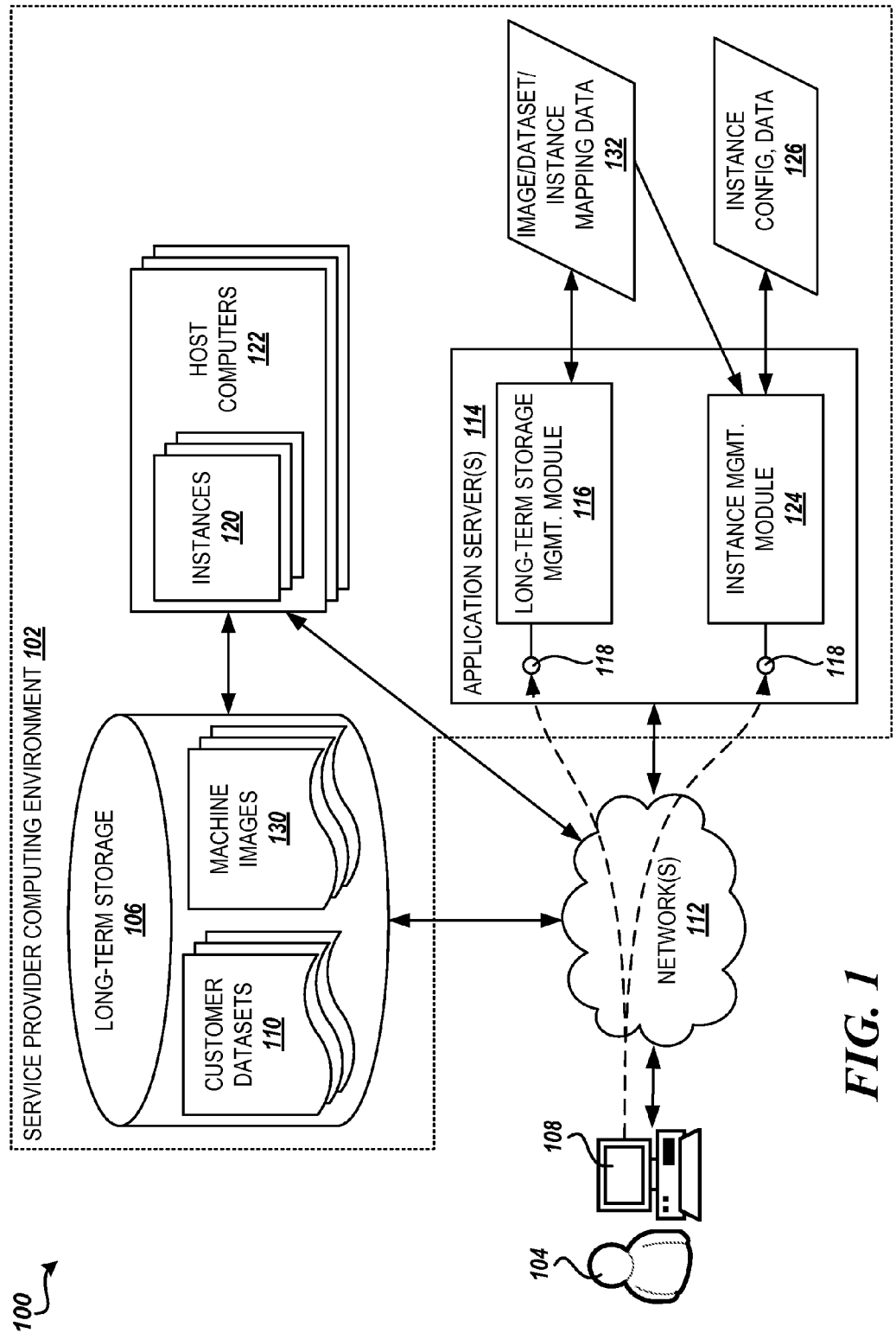
FIG. 1 is a system diagram showing aspects of an illustrative operating environment for ensuring data in long-term storage will be accessible at a future date, including several software and hardware components provided by embodiments presented herein.

The following detailed description is directed to technologies for ensuring data in long-term storage will be accessible at a future date. Utilizing the technologies described herein, an organization or individual user may store data in long-term storage along with one or more related applications required to access the data. According to embodiments, the solution utilizes machine virtualization to allow a well-defined instance of data processing resources to be created on a host computing platform for the installation and testing of the related applications. Once testing of the related applications is complete, a machine image may be generated from the instance and stored with the data in the long-term storage.

Because the instance of data processing resources is based on well-defined standards and limitations, the instance is "immortal" in that the provider of the data processing resources may guarantee that a compatible instance may be created on future host computing platforms. If access to the data stored in the long-term storage is required at a future date, the data and associated machine image may be retrieved, and a compatible instance of data processing resources created in which the machine image is restored. The data in long-term storage may then be accessed by the related applications executing in the newly created instance. Utilizing virtualization to provide immortal instances may allow for long-term storage of data in a manner that may ensure that the data may be accessed in the future without having to maintain compatible hardware and software platforms required to access the data over its useful life.

It should be appreciated that the subject matter presented herein may be implemented as a computer process, a computer-controlled apparatus, a computing system, or an article of manufacture, such as a computer-readable storage medium. These and various other features and embodiments will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several software components for ensuring data in long-term storage will be accessible at a future date, according to embodiments provided herein. The environment 100 includes a service provider computing environment 102. The service provider computing environment 102 may be implemented by a cloud computing resource provider to make computing resources available to customers 104 for the long-term storage of customer data, for the deployment and execution of distributed cloud applications, and the like.

The computing resources provided by the service provider computing environment 102 may include various classes of resources, such as data storage resources, data processing resources, data communication resources, and the like. Each class of computing resource may be general-purpose or may be available in a number of specific configurations. According to embodiments, the computer resources include long-term storage 106 for customer data. The long-term storage 106 may allow customers 104 to store data securely and reliably for extended periods of time, such as years or decades, in a cost effective fashion. The long-term storage 106 may comprise any number and type of data storage resources in the service provider computing environment 102, such as file servers, data archival devices, magnetic storage devices, optical storage devices, and the like.

A customer 104 may utilize a customer computer system 108 to connect the service provider computing environment 102 over one or more network(s) 112 to upload customer datasets 110 to the long-term storage 106. The customer datasets 110 may contain the discrete sets of data that the customer 104 wishes to store in long-term storage 106, such as one or more data files. The customer computer system 108 may represent a personal computer ("PC"), desktop workstation, laptop, notebook, personal digital assistant ("PDA"), electronic-book reader, game console, set-top box, consumer electronics device, server computer, or any other computing device capable of connecting to the network(s) 112 and accessing the long-term storage 106 provided by the service provider computing environment 102. The network(s) 112 may represent a combination of local-area networks ("LANs"), wide-area networks ("WANs"), the Internet, and/or any other networking infrastructure known in the art that connects the customer computer system 108 to the long-term storage 106 and other computing resources of the service provider computing environment 102.

The customer 104 may further utilize the customer computer system 108 to connect the service provider computing environment 102 over the network(s) 112 to allocate, configure, and manage the long-term storage resources provided by the service provider computing environment. In this regard, the service provider computing environment 102 may include a number of application servers 114 that provide various management services to the customer 104 for purchasing, allocating, and maintaining long-term storage resources, uploading and retrieving customer datasets 110 stored in the long-term storage 106, and the like. The application servers 114 may represent standard server computers, database servers, web servers, network appliances, desktop computers, other computing devices, and any combination thereof. The application servers 114 may execute a number of modules in order to provide the management services. The modules may execute on a single application server 114 or in parallel across multiple application servers in the service provider computing environment 102. In addition, each module may consist of a number of subcomponents executing on different application servers 114 or other computing devices in the service provider computing environment 102. The modules may be implemented as software, hardware, or any combination of the two.

The application servers 114 may execute a long-term storage management module 116. The long-term storage management module 116 may allow customers 104 to allocate and configure long-term storage resources, upload customer datasets 110 to the long-term storage 106, retrieve stored datasets from long-term storage, and the like. A customer 104 may utilize a Web browser application executing on the customer computer system 108 to access a user interface ("UI") presented by the long-term storage management module 116 through a Web service to access the management services related to the long-term storage 106. Additionally or alternatively, the long-term storage management module 116 may expose an application programming interface ("API") 118 which may be accessed over the network(s) 112 by stand-alone application software programs executing on the customer computer system 108. Other mechanisms for accessing the management services for long-term storage 106 of the long-term storage management module 116 may also be imagined, including remote procedure calls, SOAP-based web services, remote file access, proprietary client-server architectures, and the like.

The computer resources provided by the service provider computing environment 102 may further include data processing resources. The data processing resources may be made available in discrete units, or "instances" 120. Each instance 120 may represent the data processing resources of a dedicated host computer 122 or each instance 120 may represent a virtual machine instance executing on a host computer 122. The host computers 122 may represent generic multi-processor server devices, special-purpose hardware devices, and the like. Various types and configurations of instances 120 may be made available. For example, each available instance 120 of data processing resources may be of a particular size, such as small, medium, and large, representing different combinations of physical and/or virtual hardware resources allocated to the instance, such as number and types of processors, amounts of memory, size and speed of local storage, number of networking addresses or communication channels, and/or the like. An instance 120 may further be configured with a particular platform, such as a specific operating system ("OS") and/or hypervisor installed on the instance. Instances 120 may also be made available with specific application software components installed, such as Web server software, database management software, portal software, a specific runtime environment or platform, and the like.

The application server(s) 114 may further execute an instance management module 124. A customer 104 wishing to deploy an application on the service provider computing environment 102 may utilize the customer computer system 108 to connect the instance management module 124 to allocate, configure, and manage instances 120 of data processing resources. The customer 104 may utilize a Web browser application executing on the customer computer system 122 to access a user interface ("UI") presented by the instance management module 124 provided by the instance management module 124 to perform the allocation, configuration, and maintenance of the instances 120.

Additionally or alternatively, the instance management module 124 may expose an API 118 which may be accessed over the network(s) 112 by stand-alone application programs executing on the customer computer system 108 in the same fashion as described above. Other mechanisms for accessing the management services of the instance management module 124 may also be imagined, including remote procedure calls, SOAP-based web services, remote file access, proprietary client-server architectures, and the like. The configuration and status of each individual instance 120 as well as the various types and configurations of instances available for allocation may be stored in instance configuration data 126. The instance configuration data 126 may be stored in a database or other data storage system available to the application server(s) 114 in the service provider computing environment 102, for example.

According to embodiments, the instance configuration data 126 may define one or more "immortal instance" types. An immortal instance represents a type of instance 120 with a well-defined configuration such that the instance can be guaranteed to execute on both current host computers 122 as well as future host computing platforms. In some embodiments, immortal instances are implemented using virtualization. Virtualization allows the hardware of existing host computers to be virtualized, with a specific configuration of virtual hardware presented to the operating system ("OS") and application software programs (referred to herein as "applications") executing in the immortal instance 120P, as will be described below in more detail in regard to FIG. 2. The instance configuration data 126 may define several immortal instance types with various virtual hardware configurations and parameters, supporting various hardware architectures and platforms, executing different operating systems, and providing access to specific local and external resources, as will be described in more detail below. According to further embodiments, the immortal instance type may be more restrictive than a typical instance type and possibly less performant. The goal in defining the immortal instance types may be to strictly restrict the available functionality to a small set of well-known and well-documented standards.

In order to ensure that customer datasets 110 stored in the long-term storage 106 will be accessible at a future date, the instance management module 124 and/or the long-term storage management module 116 may provide customers 104 with a mechanism to allocate and execute one or more instances 120 of an immortal instance type in which the customer can install related applications that are needed to access the data in the datasets. As will be described in more detail below in regard to FIG. 3, the customer 104 may then execute the related applications in the immortal instances 120P to test that the applications run correctly and can access the data in the customer datasets 110 stored in the long-term storage 106. Because instances 120 of the immortal instance type(s) are guaranteed to execute on future host computers 122 in the service provider computing environment 102, the customer can be ensured that the related applications will be available to access their customer datasets 110 store in the long-term storage 106 at a future date.

According to further embodiments, the instance management module 124 and/or the long-term storage management module 116 may further provide customers 104 with a mechanism to create a machine image 130 from each of the immortal instances 120P in which the related applications were installed and tested. The machine images 130 may capture the installation and configuration of the OS and the application software program(s) in the immortal instance 120P, and allow for the installation and configuration to be recreated in an instance of the same immortal instance type or a compatible immortal instance type in the future. The machine images 130 may then be stored along with the associated customer datasets 110 in the long-term storage 106.

The long-term storage management module 116 and/or the instance management module 124 may further maintain image/dataset/instance mapping data 132. The image/dataset/instance mapping data 132 may allow mappings between the customer datasets 110 and the machine images 130 containing the related applications as well as between the machine image and the immortal instance type of the instance 120 from which the machine image was generated. The maintain image/dataset/instance mapping data 132 may be stored in a database or other data storage system available to the application server(s) 114 in the service provider computing environment 102, for example. In some embodiments, the maintain image/dataset/instance mapping data 132 may be stored in long-term storage 106 accompanying the customer datasets 110 and machine images 130.

The image/dataset/instance mapping data 132 may be utilized by the long-term storage management module 116 and the instance management module 124 to locate the associated machine image 130 and to allocate and execute an instance of the same immortal instance type or a compatible immortal instance type with the restored machine image in order for a customer 104 to retrieve and access customer datasets 110 in the long-term storage 106 at a future date, as will be described in more detail below in regard to FIG. 4. The image/dataset/instance mapping data 132 may further be utilized by the long-term storage management module 116 and/or the instance management module 124 to determine those immortal instance types that are no longer tied to a customer dataset 110 and associated machine image 130 and can be deprecated, and those with which compatibility must be maintained in new host computers 122 and/or new generations of immortal instance types, as will be further described below.

Figure 2:
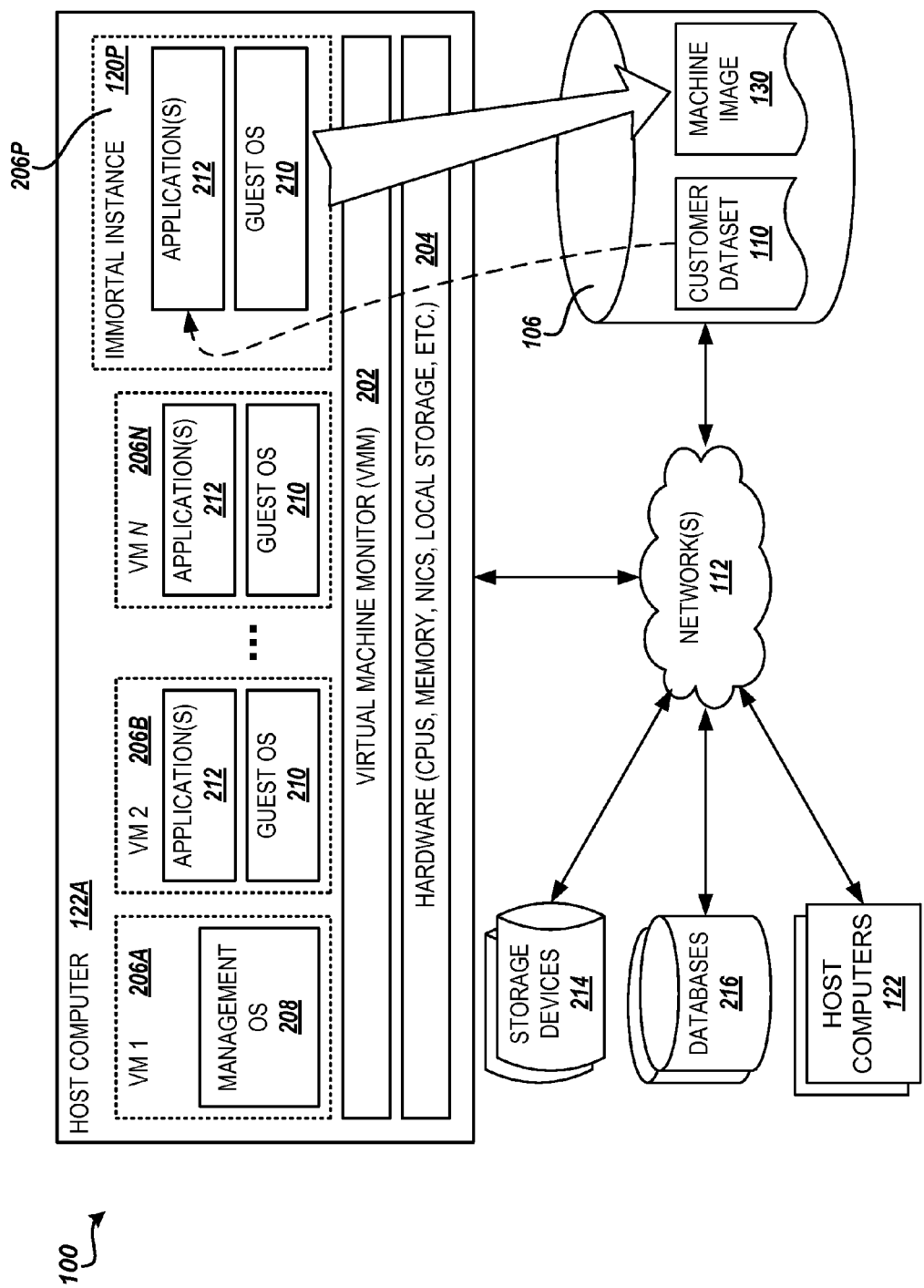
FIG. 2 is a block diagram showing further aspects of a virtualization environment supporting aspects of the embodiments presented herein.

FIG. 2 is a block diagram of an example virtualization architecture 200 that may be utilized to provide the immortal instance types described herein, according to embodiments. The virtualization architecture 200 includes a virtual machine monitor ("VMM") 202, also referred to as a hypervisor, that allows multiple independent guest operating systems to concurrently execute on a single host computer 122A. The VMM 202 abstracts the hardware 204 of the host computer 122A to create one or more virtual machines 206A-206N (referred to herein generally as virtual machine 206). The VMM 202 may be implemented in the hardware of the host computer 122A, or it may be implemented as a software module that executes at a low-level in the host computer to provide services to the virtual machines 206.

One virtual machine 206A may host a management OS 208. The management OS 208 may be automatically started by the VMM 202 upon startup of the host computer 122A, and may provide administrators of the host computer tools and facilities for managing the VMM and the other virtual machines 206B-206N. The virtual machine 206A hosting the management OS 208 may execute at a higher privilege level than the other virtual machines 206B-206N, and the management OS may also provide services to the other virtual machines through the VMM 202, such as loading of hardware drivers for the host computer, virtualizing hardware resources within virtual machines 206B-206N, arbitrating access to the hardware 204 of the host computer 122A, and the like. In a specific embodiment, the management OS 208 may be a specifically modified version of the LINUX operating system, for example.

The other virtual machines 206B-206N may each provide an instance 120 of data processing resources for customers 104 of the service provider computing environment 102, as described above in regard to FIG. 1. Each virtual machine 206B-206N may run an instance of a guest OS 210 as well as execute one or more applications 212 to provide services to customers 104 and other end users across the networks 112. According to one embodiment, the VMM 202 may support both paravirtualized and unmodified guest OSs 210. A paravirtualized guest OS 210 is modified to run in a virtual machine 206 provided by the VMM 202, while an unmodified guest OS 210 may be a version of an operating system that is configured to execute directly on physical hardware. Guest OSs 210 may include the MICROSOFT® WINDOWS® operating system from MICROSOFT Corporation of Redmond, Wash., the ORACLE® SOLARIS operating system from ORACLE Corporation of Redwood City, Calif., the LINUX operating system, the UNIX operating system, the NetBSD operating system, and the like.

It will be appreciated that the embodiments described herein may be enabled by other virtualization architectures beyond the virtualization architecture 200 described above and shown in FIG. 2. For example, the management OS 208 may run directly above and control access to the hardware 204 of the host computer 122A. In addition, while FIG. 2 shows the VMM 202 as separate from the management OS, embodiments where the functionality of the management OS and VMM are integrated are within the scope of this disclosure.

According to embodiments, the VMM 202, in conjunction with the management OS 208, controls the virtualization of the hardware 204 of the host computer 122A in the virtual machines 206. The hardware 204 includes central processing units ("CPUs") or processors, physical memory, network interface cards ("NICs"), local storage devices, input/output ("I/O") controllers, and the like. The VMM and/or management OS 208 may create each virtual machine 206 with a specific virtualized hardware configuration. For example, the VMM 202 may restrict the CPU instructions available in a virtual machine 206 in order to limit the guest OS 210 and application(s) 212 executing in the virtual machines to a well-defined instruction set compatible across a variety of host computers 122. Similarly, the VMM 202 may limit the available registers, the amount of main memory, the amount of cache memory, the number of interrupts, the number of networking addresses, and other hardware resources available in the virtualized hardware configuration of each virtual machine 206. In addition, the VMM 202 and/or management OS 208 may provide emulation of a specific hardware platform or architecture, within a virtual machine 206.

The virtualized hardware configuration utilized by the VMM 202 and/or management OS 208 to create each virtual machine 206 may be based on the configuration parameters defined for an instance type in the instance configuration data 126 associated with the instance 120 corresponding to the virtual machine. The instance configuration data 126 may comprise data that instructs the VMM 202 and/or management OS 208 as to the mapping of physical hardware resources to virtual hardware resources and other parameters of the virtualized hardware configuration for the virtual machine 206. Similarly, the instance configuration data 126 may define access of the guest OS 210 and applications 212 executing in the virtual machine 206 to storage devices 214, databases 216, other host computers 122, and the like across the networks 112.

According to embodiments, a virtual machine 206P may be created by the VMM 202 in the host computer 122A to host an instance 120 based on an immortal instance type (also referred to herein as immortal instance 120). As described above, the immortal instance 120P may be created based on a well-defined virtualized hardware architecture designed to create a compatible environment for the applications 212 of a customer 104 as well as to ensure that the instance can be executed on future versions of hardware platforms and/or virtualization architectures. For example, the instance configuration data 126 defining the immortal instance 120P may specify that the corresponding virtual machine 206P is limited to a core or well-defined CPU instruction set to ensure a broad level of compatibility. The instance configuration data 126 may further define specific timing behaviors for the virtual machine 206P, such as a CPU clock speed, a memory lookup response time, a bus data transition rate, timing of event responses, ordering of event responses, and the like. In further examples, the instance configuration data 126 may define a specific prefetch behavior, a specific threading behavior, the specific interrupts supported, and other virtualized hardware configurations for the virtual machine 206P corresponding to the immortal instance 120P. The instance configuration data 126 may further define the amount of main memory and/or cache memory available to the corresponding virtual machine 206P, access of the guest OS 210 and applications 212 executing in the virtual machine to a particular well-defined virtualized block storage device or file system, and the like.

In some embodiments, the VMM 202 and/or management OS 208 may sandbox the guest OS 210 and the application(s) 212 executing in the immortal instance 120P in order to control and limit their access to external resources or services across the network(s) 112, such as storage devices 214, databases 216, other host computers 122, Web services and other Internet-based data sources, and the like. This may be done to ensure that the guest OS 210 and application(s) 212 can run in an environment that can be recreated in the future when such external resources may not be available. In other embodiments, the instance configuration data 126 defining the immortal instance 120P may include the specification of specific external resources or services, such as the long-term storage 106, that are available to the guest OS 210 and application(s) 212. In these instances, the service provider computing environment 102 may be required to provide the specified resources and/or services or compatible resources and/or services to immortal instances 120P created on the host computers 122 for as long as a mapping between a customer dataset 110 and corresponding machine image 130 and the immortal instance type remains in the image/dataset/instance mapping data 132.

In additional embodiments, different immortal instance types may be defined in the instance configuration data 126 that specify different guest OSs 210 to be executed in the corresponding virtual machines 206 and that support different application architectures and environments. Similarly, the configuration parameters in the instance configuration data 126 defining each immortal instance type may specify the hardware platforms or computer architectures on which immortal instances 120P of that type may be created, the type of virtualization software required for the corresponding virtual machines 206, and the like.

Over time, new definitions of immortal instance types for new or different hardware platforms or supporting different operating systems and/or application architectures may be defined in the instance configuration data 126. The instance configuration data 126 for these new immortal instance types may further specify backward compatibility with older immortal instance types. For example, immortal instance types may be defined in recursive generations, wherein the current generation of an immortal instance type is guaranteed to support or emulate the previous generation in the series. In this way guest OSs 210 and applications 212 that are able to execute in an immortal instance 120P created from an earlier version of the immortal instance type will be able to run in immortal instances created from the current generation of the immortal instance type.

It will be appreciated that, as new host computers 122 of new or differing hardware architectures are introduced into the service provider computing environment 102, the new host computers may be tested with the current generations of immortal instance types to ensure compatibility before older host computers supporting the immortal instance types are deprecated. Similarly, new generations of immortal instances types may be tested for compatibility with previous generations before the older generation immortal instance types are deprecated. In some embodiments, such compatibility testing may be performed utilizing generic test specifications that test the compatibility in the virtualized hardware configuration and/or other accessible resources defined for virtual machines 206 corresponding to immortal instances 120P created from the specific immortal instance type, as will be described in more detail below in regard to FIG. 5.

Additionally or alternatively, compatibility testing may involve creating immortal instances 120P from the new immortal instance type and loading one or more machine images 130 associated with a previous generation of that instance type in the image/dataset/instance mapping data 132. The operating system and related applications contained in the machine image 130 may then be tested for compatibility with immortal instances 120P created from the new instance type and/or executing on the new hardware platform based on testing specifications created for the machine image. Those immortal instance types for which compatibility must be maintained may be further determined based on the existence of a mapping between a customer dataset 110 and corresponding machine image 130 and the immortal instance type in the image/dataset/instance mapping data 132, as described above.

Figure 3:
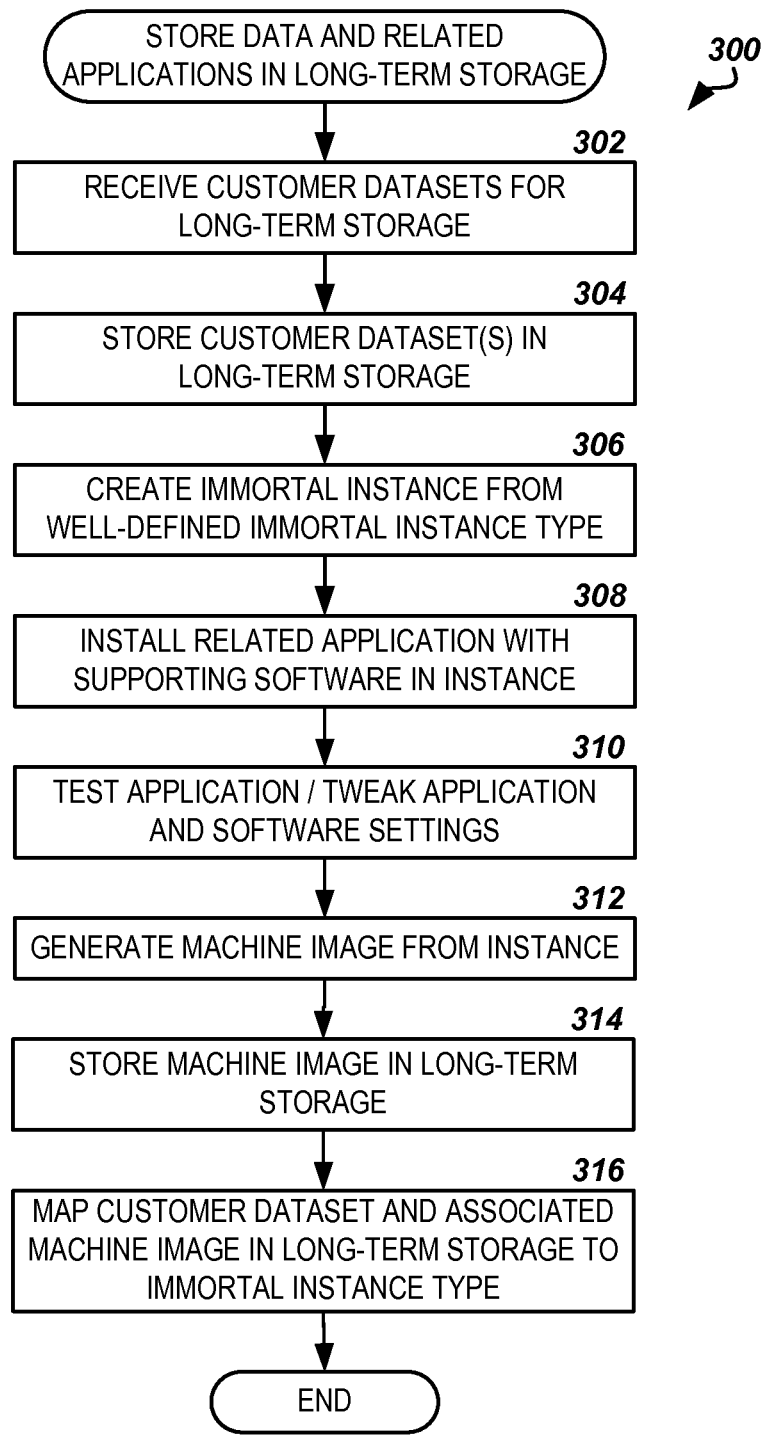
FIG. 3 is a flow diagram showing one method for storing data and related applications in long-term storage so that it may be reliably accessed at a future date, according to embodiments described herein.
Figure 4:
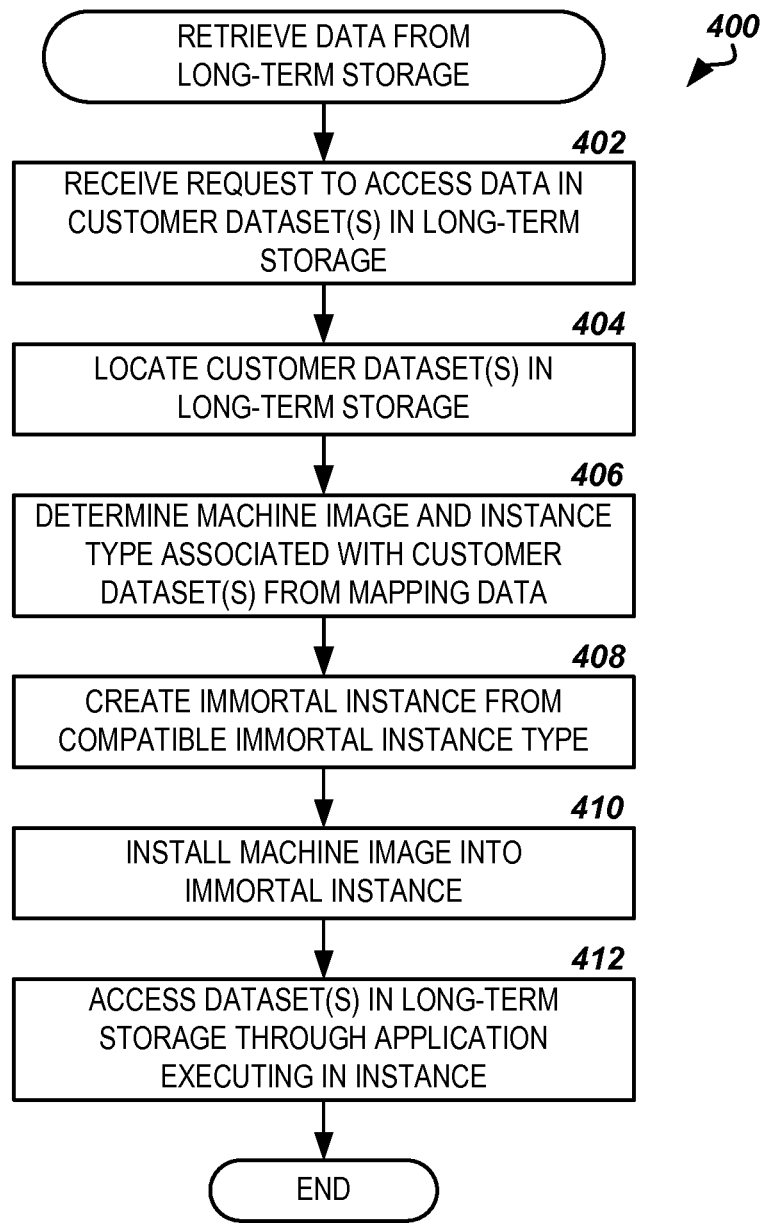
FIG. 4 is a flow diagram showing one method for retrieving data from long-term storage utilizing the related applications, according to embodiments described herein.
Figure 5:
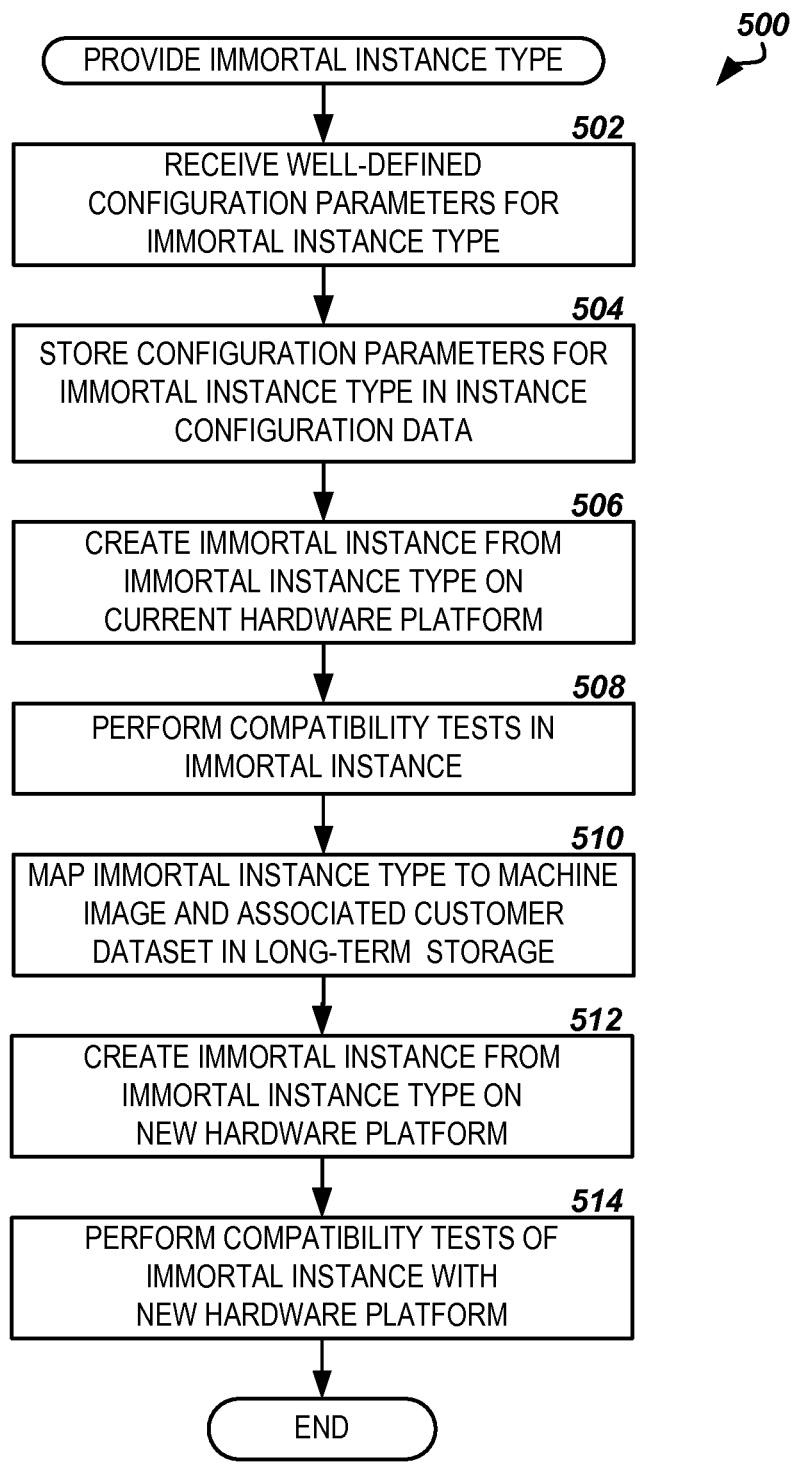
FIG. 5 is a flow diagram showing one method for providing an immortal instance type for which compatibility with future hardware platforms may be ensured, according to embodiments described herein.

Turning now to FIGS. 3-5, additional details will be provided regarding the embodiments presented herein for ensuring data in long-term storage will be accessible at a future date. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 illustrates one routine 300 for storing data and related applications in long-term storage so that it may be reliably accessed at a future date, according to embodiments described herein. The routine 300 may be performed by the long-term storage management module 116 and/or the instance management module 124 executing on the application server(s) 114, by another module or component in the service provider computing environment 102, or by any combination of modules and components.

The routine 300 begins at operation 302, where the long-term storage management module 116 receives one or more customer datasets 110 that a customer 104 desires to be placed into long-term storage 106 and to remain accessible for an extended period of time. As described above in regard to FIG. 1, the customer 104 may utilize a Web browser application executing on the customer computer system 108 to access a UI presented by the long-term storage management module 116 to upload the customer dataset(s) 110 to previously allocated long-term storage 106, for example. The routine 300 proceeds from operation 302 to 304, where the long-term storage management module 116 stores the received customer dataset(s) 110 in the long-term storage 106.

From operation 304, the routine proceeds to operation 306, where the instance management module 124 creates an immortal instance 120P on a host computer 122 based on an immortal instance type. According to some embodiments, the customer 104 may select an available immortal instance type from those defined in the instance configuration data 126 that best supports the related applications required to access the data in the customer datasets 110. In other embodiments, the long-term storage management module 116 and/or the instance management module 124 may determine the immortal instance type from which to create the immortal instance 120P based on specifications provided by the customer 104, such as hardware requirements and operating system, for example.

As described above in regard to FIG. 2, the instance management module 124 may create a virtual machine 206P corresponding to the immortal instance 120P on a host computer 122A in the service provider computing environment 102 that is indicated as compatible with the immortal instance type in the instance configuration data 126. The virtual machine 206P may further comprise a specific virtualized hardware configuration and execute an appropriate guest OS 210 based on the configuration parameters stored in the instance configuration data 126 defining the selected immortal instance type. The configuration parameters in the instance configuration data 126 may further define the internal and external resources available to the guest OS 210 and application(s) 212 executing in the virtual machine 206P corresponding to the immortal instance 120P.

The routine 300 proceeds from operation 306 to operation 308, where the customer 104 installs one or more related applications 212 required to access the data in the customer dataset(s) 110 along with any other supporting software into the newly created immortal instance 120P for testing. Once the immortal instance 120P has been allocated on the host computer 122A and the guest OS 210 has been initialized, the customer 104 may be granted access to the immortal instance to install, configure, and maintain the guest OS and application(s) 212 on the instance. In some embodiments, the access may be facilitated by the instance management module 124. In other embodiments, the customer 104 may utilize a remote client application executing on the customer computer system 108 to directly access and control the immortal instance 120P, depending on the capabilities and protocols supported by the guest OS 210 executing in the instance.

From operation 308, the routine 300 proceeds to operation 310, where the customer 104 tests the installed related applications 212 in the immortal instance 120P. According to some embodiments, the related applications 212 executing in the immortal instance 120P are provided direct access to the data in the customer dataset(s) 110 stored in the long-term storage 106, as shown in FIG. 2. In other embodiments, the data in the customer dataset(s) 110 may be extracted and stored in a virtual file system or block storage device supported by local or external storage devices in order to facilitate testing of the related application(s) 212.

The customer 104 may further tweak the installation and configuration of the installed application(s) 212 and/or the guest OS 210 in order to ensure proper operation of the related applications in the immortal instance 120P. For example, because the virtualized hardware configuration for the corresponding virtual machine 206P may be restricted to a small set of well-known and well-documented standards based on the immortal instance type, certain features or enhancements in the related application(s) 212 may have to be disabled in order to ensure that the applications function correctly in the immortal instance 120P. Similarly, since the guest OS 210 and the related application(s) 212 may be sandboxed in the corresponding virtual machine 206P and have limited access to internal and external resources and services, the related applications may have to be configured or altered to eliminate external dependencies on such resources and services.

In some embodiments, the customer 104 may be able to further modify the configuration parameters of the immortal instance 120P, such as adjusting the CPU timings or clock speed in the corresponding virtual machine 206P, in order for the related application(s) 212 to execute properly. The ability to adjust the configuration parameters for the instance may be provided by the instance management module 124, for example. Any modifications made to the configuration parameters of the immortal instance 120P may be stored in metadata associated with the machine image 130 generated from the instance, as will be described below, in order that these modification may be applied to any future immortal instance created to support the machine image 130 and the application installations contained therein. According to further embodiments, the customer 104 may be provided with the ability to change the immortal instance type of the immortal instance 120P to a type that better supports the related application(s) 212 and/or provides the necessary external dependencies required for the applications to execute properly, for example.

The routine 300 proceeds from operation 310 to operation 312, where a machine image 130 is generated from the immortal instance 120P, as further shown in FIG. 2. Once the testing and tweaking of the related application(s) is completed successfully, the long-term storage management module 116 and/or the instance management module 124 may create the machine image 130 capturing the installation and configuration of the guest OS 210 and the related application(s) 212 in the immortal instance 120P. At operation 314, the generated machine image 130 may then be stored in the long-term storage 106 associated with the customer dataset(s) 110 containing the data accessed by the related application(s) 212. In some embodiments, the data from the customer dataset(s) 110 that was extracted to a local storage of the immortal instance 120P for testing purposes may further be included in the machine image 130 stored in the long-term storage 106.

From operation 314, the routine 300 proceeds to operation 316, where the long-term storage management module 116 updates the image/dataset/instance mapping data 132 to include a mapping between the customer dataset(s) 110 and the associated machine image 130 in long-term storage 106 and the immortal instance type of the immortal instance 120P from which the machine image was generated. According to embodiments, the mapping between the customer dataset(s) 110 and the associated machine image 130 and the immortal instance type ensures that the immortal instance type or a compatible instance type will exist in the future from which an immortal instance 120P can be created and the machine image 130 restored therein. From operation 316, the routine 300 ends.

FIG. 4 illustrates a routine 400 for retrieving data from long-term storage utilizing the related applications, according to embodiments. The routine 400 may be performed by the long-term storage management module 116 and/or the instance management module 124 executing on the application server(s) 114, by another module or component in the service provider computing environment 102, or by any combination of modules and components.

The routine 400 begins at operation 402, where the long-term storage management module 116 receives a request to access the data in one or more customer datasets 110 in long-term storage 106. For example, a customer 104 may utilize a Web browser application executing on the customer computer system 108 to access a UI presented by the long-term storage management module 116 to request access to the customer dataset(s) 110 previously uploaded to long-term storage 106. The routine 400 proceeds from operation 402 to 404, where the long-term storage management module 116 locates the specified customer dataset(s) 110 in the long-term storage 106.

From operation 404, the routine proceeds to operation 406, where the long-term storage management module 116 searches the image/dataset/instance mapping data 132 to locate a machine image 130 associated with the customer dataset(s) 110 as well as an immortal instance mapped to the machine image. Next, the routine 400 proceeds from operation 406 to operation 408, where the instance management module 124 creates an immortal instance 120P on a host computer 122 based on the immortal instance type mapped to the machine image 130. According to embodiments, the instance management module 124 may utilize the specific immortal instance type mapped to the associated machine image 130, or the instance management module 124 may select another immortal instance type indicated as compatible with the mapped immortal instance type in the instance configuration data 126. For example, the instance management module 124 may select the latest generation immortal instance type from the series of the mapped immortal instance type that is guaranteed to be backward compatible with the original instance type, as discussed above in regard to FIG. 2.

The instance management module 124 may then create a virtual machine 206P corresponding to the immortal instance 120P on a host computer 122A in the service provider computing environment 102 that is indicated as compatible with the selected immortal instance type in the instance configuration data 126, as described above in regard to operation 306. Any modifications made to the configuration parameters of the immortal instance 120P that is stored in metadata associated with the machine image 130 is further applied to the created immortal instance 120P.

The routine 400 proceeds from operation 408 to operation 410, where the long-term storage management module 116 and/or the instance management module 124 installs the machine image 130 in the corresponding virtual machine 206 to create the immortal instance 120P. Next, the routine 400 proceeds to operation 412, where the customer 104 accesses the data in the customer dataset(s) 110 utilizing the related application(s) 212 executing in the newly created immortal instance 120P. For example, the customer 104 may utilize a remote client application executing on the customer computer system 108 to directly access the immortal instance 120P and execute the related application(s) 212 to access the data. According to some embodiments, the related application(s) 212 executing in the immortal instance 120P are provided direct access to the data in the customer dataset(s) 110 stored in the long-term storage 106, as shown in FIG. 2. In other embodiments, the data in the customer dataset(s) 110 may be extracted and stored in a virtual file system or block storage device supported by local or external storage devices in order to facilitate access to the data by the related application(s) 212. From operation 412, the routine 400 then ends.

FIG. 5 is a flow diagram showing a routine 500 for ensuring compatibility of an immortal instance type with new hardware platforms, according to embodiments. The routine 500 may be performed and/or facilitated by the instance management module 124 executing on the application server(s) 114, by another module or component in the service provider computing environment 102, or by any combination of modules and components.

The routine 500 begins at operation 502, where the instance management module 124 receives configuration parameters for an immortal instance type. As described above, the immortal instance type parameters may include configuration parameters for a virtual machine 206P that hosts a corresponding immortal instance 120P based on a set of well-known and well-documented standards. For example, the immortal instance type may define a core or well-defined CPU instruction set that is exposed to the guest OS 210 and applications 212 executing in the immortal instance 120P. The immortal instance type may further define the amount of main memory and/or cache memory available to the virtual machine 206P, specific timing behaviors for the virtual machine, a specific prefetch behavior, a specific threading behavior, specific interrupts supported, and other virtualized hardware configurations for the virtual machine 206P.

The configuration parameters for the immortal instance type may further define the hardware platform requirement for the immortal instance type, the type of guest OS 210 to be executed in the virtual machine 206P, the virtualization software or architecture required, the types of internal and external resources available to the guest OS and applications 212 executing in the virtual machine, such as a well-defined virtualized block storage device or file system, and the like. Upon receiving the configuration parameters for the immortal instance type, the routine 500 proceeds to operation 504, where the instance management module 124 stores the received configuration parameters for the immortal instance type in the instance configuration data 126, From operation 504, the routine 500 proceeds to operation 506, where the instance management module 124 creates an immortal instance 120P from the immortal instance type on a compatible host computer 122 in the service provider computing environment 102 based on the hardware platform and/or the virtualization software or architecture required by the configuration parameters. Next, at operation 508, testing is performed in the immortal instance 120P to ensure compatibility of applications and the specified guest OS 210 with the configuration parameters of the immortal instance type and corresponding virtual machine 206P. For example, a suite of testing applications or scripts that model application behavior in the immortal instance 120P may be executed, while calls to the virtualized hardware configuration by the testing applications and guest OS 210 are monitored by the VMM 202 and/or management OS 208 to ensure that only CPU instructions supported by the immortal instance type are issued, that the timing behaviors specified in the configuration parameters for the immortal instance type are adhered to, that only supported interrupts are raised, that only supported internal and external resources are accessed, and the like.

From operation 508, the routine 500 proceeds to operation 510, where a mapping between the immortal instance type and one or more machine images 130 and associated customer datasets 110 in long-term storage 106 is created in the image/dataset/instance mapping data 132. For example, the long-term storage management module 116 may create the mapping after generation of a machine image 130 from an immortal instance 120P created from the immortal instance type to support access to customer dataset(s) 110 for a customer stored in long-term storage 106, as described above in regard to operation 316. According to embodiments, the mapping between the immortal instance type and a machine image 130 and associated customer dataset(s) 110 ensures that compatibility with the immortal instance type defined in the instance configuration data 132 is maintained as current hardware platforms are deprecated and new hardware platforms are introduced in the service provider computing environment 102.

It will be appreciated that, as new host computers 122 of new or differing hardware or virtualization architectures are introduced into the service provider computing environment 102, the new host computers may be tested for compatibility with the current generation of immortal instance types that also have mappings maintained in the image/dataset/instance mapping data 132 before older host computers supporting the immortal instance types are deprecated. In order to facilitate such compatibility testing of a new host computer 122 or hardware/virtualization platform with the immortal instance type defined in the instance configuration data 132, the routine 500 proceeds from operation 510 to 512, where the instance management module 124 creates a new immortal instance 120P from the configuration parameters of the immortal instance type on the new host computer 122.

Next, the routine 500 proceeds from operation 512 to operation 514, where compatibility tests are performed in the newly created immortal instance 120P to ensure that the immortal instance is compatible with the new host computer 122 and its associated hardware platform and virtualization architecture. The tests may be performed utilizing the same suite of testing applications or scripts utilized in operation 508 above, while execution of the testing applications and guest OS 210 are monitored for failures by the VMM 202 and/or management OS 208. Additionally or alternatively, compatibility testing may involve loading one or more machine images 130 mapped to the immortal instance type in the image/dataset/instance mapping data 132 and executing the operating system and related applications contained in the machine image to test compatibility with the immortal instance 120P executing on the new host computer 122 or hardware/virtualization platform. From operation 514, the routine 500 ends.

Figure 6:
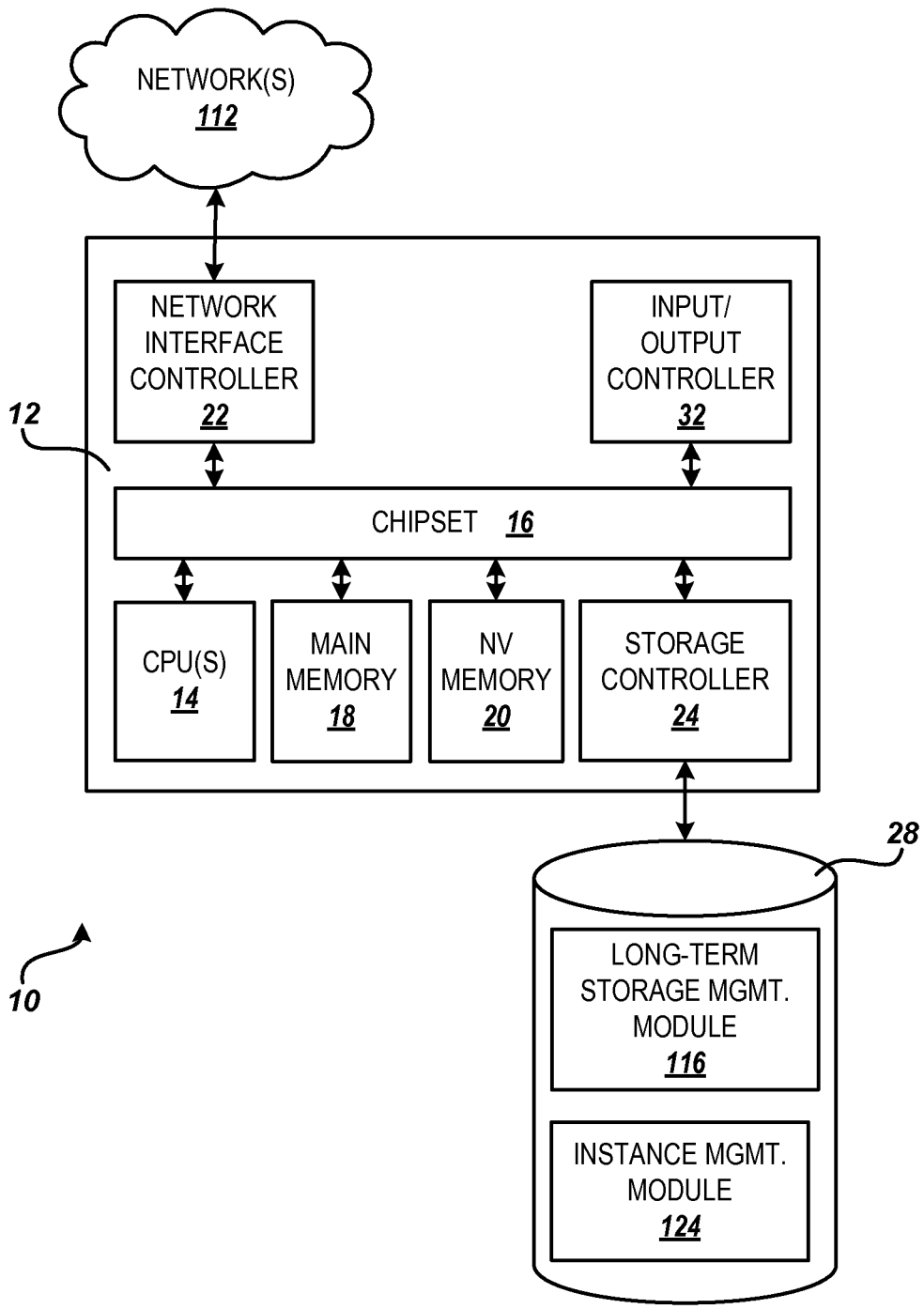
FIG. 6 is a computer architecture diagram showing an illustrative computer hardware architecture for computing devices described in embodiments presented herein.

FIG. 6 shows an example computer architecture 10 for a computer 12 capable of executing the software components described herein for providing a marketplace for the remaining term of reserved instances, in the manner presented above. The computer architecture 10 shown in FIG. 6 illustrates a conventional server computer, workstation, desktop computer, laptop, PDA, electronic book reader, digital wireless phone, network appliance, set-top box, or other computing device, and may be utilized to execute any aspects of the software components presented herein described as executing on the application servers 114, the host computers 122, the customer computer system 108, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through a network, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices, such as other application servers 114, the customer computer systems 108, a data storage system in the service provider computing environment 102, and the like, over the network(s) 112 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, and the like.

The mass storage device 28 may store an operating system utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the long-term storage management module 116 and/or the instance management module 124 described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 300, 400, and 500 for ensuring data in long-term storage will be accessible at a future date, as described above in regard to FIGS. 3-5.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 6, may include other components that are not explicitly shown in FIG. 6, or may utilize an architecture completely different than that shown in FIG. 6.

Based on the foregoing, it should be appreciated that technologies for ensuring data in long-term storage will be accessible at a future date are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:
receive a customer dataset;
store the customer dataset in long-term storage;
create a first virtual machine on a host computer based on a first immortal instance type, the first immortal instance type defining a well-defined virtualized hardware configuration such that virtual machines implementing the well-defined virtualized hardware configuration may be created on future host computing platforms;
create a first instance of data processing resources in the first virtual machine, the first instance configured such that a related application capable of accessing data in the customer dataset may be installed and executed in the first instance and tested and configured for compatibility with the first instance;
generate a machine image of the first instance, the machine image comprising the installation and configuration of the related application in the first instance;
store the machine image in the long-term storage associated with the customer dataset; and
map the customer dataset and the associated machine image in the long-term storage to the first immortal instance type in mapping data.

2. The computer-readable storage medium of claim 1, wherein testing the related application comprises utilizing the related application executing in the first instance to access the data in the customer dataset in the long-term storage.

3. The computer-readable storage medium of claim 1, wherein the well-defined virtualized hardware configuration comprises a definition of one or more of a CPU instruction set or a standard file system or block storage device available to an operating system and the related application executing in the first virtual machine.

4. The computer-readable storage medium of claim 1, having further computer-executable instructions stored thereon that cause the computer to:
receive a request to access the data in the customer dataset stored in the long-term storage;
locate an entry in the mapping data mapping the customer dataset to the associated machine image in the long-term storage and to the first immortal instance type;
create a second virtual machine on a host computer based on the first immortal instance type;
install the associated machine image in the second virtual machine to create a second instance of data processing resources; and
execute the related application in the second instance to access the data in the customer dataset.

5. The computer-readable storage medium of claim 4, wherein the second virtual machine is created based on a second immortal instance type indicated as compatible with the first immortal instance type in instance configuration data.

6. A computer-implemented method of ensuring data in long-term storage will be accessible at a future date, the method comprising executing instructions in a computer system to perform the operations of:
receiving a customer dataset comprising the data;
storing the customer dataset in the long-term storage;
creating a first immortal instance of a virtual machine on a host computer based on an immortal instance type, the immortal instance type defining well-defined configuration parameters for a virtualized hardware configuration such that virtual machines implementing the virtualized hardware configuration may be created on future host computing platforms;
facilitating an installation of a related application capable of accessing the data in the customer dataset in the first immortal instance;
generating a machine image of the first immortal instance, the machine image comprising the installation of the related application in the first immortal instance;
storing the machine image in the long-term storage associated with the customer dataset; and
mapping the customer dataset and the associated machine image in the long-term storage to the immortal instance type, the mapping enabling a second immortal instance of a virtual machine to be created on a future host computer based on the immortal instance type, the machine image to be restored to the second immortal instance, and the related application to be executed in the second immortal instance to access the data in the customer dataset.

7. The computer-implemented method of claim 6, further comprising maintaining mappings of customer datasets and associated machine images in the long-term storage to immortal instance types in mapping data to ensure that one or more host computer configurations in a service provider computing environment remain compatible with those immortal instance types for which a mapping exists.

8. The computer-implemented method of claim 6, further comprising testing and configuring the related application installed in the first immortal instance to achieve compatibility of the related application with the first immortal instance.

9. The computer-implemented method of claim 8, wherein testing the related application installed in the first immortal instance comprises executing the related application in the first immortal instance to access the data in the customer dataset in the long-term storage.

10. The computer-implemented method of claim 6, wherein the well-defined configuration parameters for the immortal instance type comprise a definition of an operating system for the first immortal instance.

11. The computer-implemented method of claim 6, wherein the well-defined configuration parameters for the immortal instance type comprise a definition of a CPU instruction set available to an operating system and the related application executing in the first immortal instance.

12. The computer-implemented method of claim 6, wherein the well-defined configuration parameters for the immortal instance type comprise a definition of an amount of memory available to an operating system and the related application executing in the first immortal instance.

13. The computer-implemented method of claim 6, wherein the well-defined configuration parameters for the immortal instance type comprise a definition of a file system or standard block storage device available to an operating system and the related application executing in the first immortal instance.

14. The computer-implemented method of claim 6, wherein the well-defined configuration parameters for the immortal instance type comprise a definition of one or more external resources or services available to the related application executing in the first immortal instance.

15. The computer-implemented method of claim 6, wherein the well-defined configuration parameters for the immortal instance type comprise a definition of a timing behavior exposed to an operating system and the related application executing in the first immortal instance.

16. The computer-implemented method of claim 6, wherein creating the second immortal instance comprises creating a virtual machine on the future host computer based on a second immortal instance type indicated as compatible with the immortal instance type of the first immortal instance in instance configuration data.

17. A system ensuring data in long-term storage will be accessible at a future date, the system comprising:
the long-term storage configured to store data for an extended period;
a host computer configured to implement one or more instances of data processing resources;
an application server having a main memory and a processor; and
one or more modules residing in the main memory of the application server and configured to cause the processor to
receive a customer dataset containing the data,
store the customer dataset in the long-term storage,
create a first immortal instance of a virtual machine on the host computer based on a first immortal instance type, the first immortal instance type defining well-defined configuration parameters for a virtualized hardware configuration such that virtual machines implementing the virtualized hardware configuration may be created on future host computing platforms and the first immortal instance configured such that a related application capable of accessing the data in the customer dataset may be installed and configured in the first immortal instance,
generate a machine image of the first immortal instance, the machine image comprising the installation and configuration of the related application in the first immortal instance,
store the machine image in the long-term storage associated with the customer dataset, and
map the customer dataset and the associated machine image in the long-term storage to the first immortal instance type in mapping data.

18. The system of claim 17, wherein the mapping ensures that one or more host computer configurations in a service provider computing environment remain compatible with the first immortal instance type as long as the mapping exists.

19. The system of claim 17, wherein the well-defined virtualized hardware configuration comprises a definition of one or more of a CPU instruction set, an amount of memory, or a standard file system or block storage device available to an operating system and the related application executing in the first immortal instance.

20. The system of claim 17, wherein the one or more modules are further configured to cause the processor to:
receive a request to access the data in the customer dataset stored in the long-term storage;
locate an entry in the mapping data mapping the customer dataset to the associated machine image in the long-term storage and to the first immortal instance type;
create a second immortal instance on the host computer based on the first immortal instance type;
restore the associated machine image to the second immortal instance; and
execute the related application in the second immortal instance to access the data in the customer dataset.

21. The system of claim 20, wherein creating the second immortal instance comprises creating a second virtual machine on the host computer based on a second immortal instance type indicated as compatible with the first immortal instance type in instance configuration data.

22. A computer-implemented method of providing an immortal instance type, the method comprising executing instructions in a computer system to perform the operations of:
receiving an immortal instance type, the immortal instance type defining well-defined configuration parameters for a virtualized hardware configuration such that virtual machines implementing the virtualized hardware configuration may be created on future host computing platforms;
storing the well-defined configuration parameters of the immortal instance type in instance configuration data;
creating a first immortal instance of a virtual machine on an existing host computer based on the immortal instance type;
facilitating testing of compatibility of applications and operating system(s) with the first immortal instance based on the well-defined configuration parameters of the immortal instance type;
mapping the immortal instance type to a machine image and associated customer dataset in long-term storage;
creating a second immortal instance of a virtual machine on a new host computer based on the immortal instance type stored in the instance configuration data; and
facilitating testing of compatibility of the second immortal instance with the new host computer.

23. The computer-implemented method of claim 22, wherein testing of compatibility of applications and operating system(s) with the first immortal instance comprises executing one or more testing applications in the first immortal instance while monitoring calls made by the one or more testing applications and an associated operating system to a virtualized hardware platform of the host computer to ensure compatibility of the calls with the well-defined configuration parameters of the immortal instance type.

24. The computer-implemented method of claim 23, wherein testing of compatibility of the second immortal instance with the new host computer comprises executing the one or more testing applications and the associated operating system in the second immortal instance while monitoring for errors.

25. The computer-implemented method of claim 22, wherein the well-defined configuration parameters for the immortal instance type comprise one or more of a definition of a CPU instruction set available to an operating system and applications executing in immortal instances created from the immortal instance type and a definition of a timing behavior exposed to the operating system and the applications executing in the immortal instances.

* * * * *